Jan. 18, 1949.  E. J. POLTORAK  2,459,721
METHOD OF MANUFACTURING GASKETS
Filed Jan. 26, 1946

INVENTOR
Emil J. Poltorak.
BY Virgil L. Kline
ATTORNEY

Patented Jan. 18, 1949

2,459,721

UNITED STATES PATENT OFFICE 2,459,721

METHOD OF MANUFACTURING GASKETS

Emil J. Poltorak, Somerville, N. J., assignor to Johns-Manville Corporation, New York, N. Y., a corporation of New York Application January 26, 1946, Serial No. 643,590

4 Claims. (Cl. 154—33.1)

This invention relates to heat and chemical resistant gaskets, and is particularly concerned with a method of manufacturing heat, chemical and solvent resistant gaskets.

The method of manufacturing gaskets which forms the subject of the present invention represents a continuation-in-part of and improvement on that described in my copending patent application, Serial No. 583,543, for Folded fabric gasket and method of manufacture, filed March 19, 1945. The subject of said parent application is a gasket having the properties of heat and chemical resistance as well as softness or resilience. The properties of solvent and chemical resistance are imparted to the gasket by wrapping it with a thin flexible tape of high solvent and chemical resistance, as well as heat resistance, to form a jacket protecting and tightly fitting all surfaces of the gasket.

An object of the present invention is to provide an improved method for forming heat and chemical resistant gaskets embodying soft and resilient fibrous cores and jacketed with thin heat- and chemical-proof sheets or tapes applied as surface protective wrappings.

A more specific object is to provide a jacketed gasket of the type forming the subject of my aforementioned parent application in which the body or core has substantial resistance to acids or chemical attack and possesses substantial structural strength by reason of being formed by a method which develops no internal stresses or strains.

With the aforementioned objects in view the invention consists in the improved method of manufacturing jacketed gaskets which is hereinafter described and more particularly defined by the accompanying claims.

In the following description of a preferred form of the invention reference will be made to the attached drawings, in which.

Figure 4:
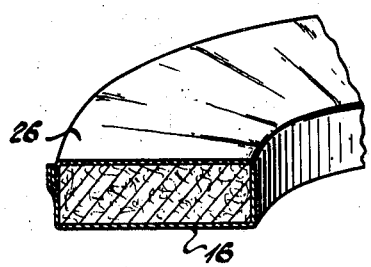
Figure 5:
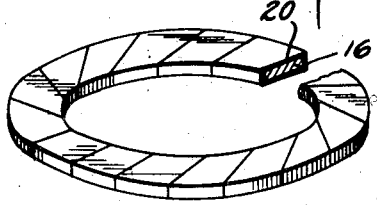

Fig. 4 is an enlarged cross-section, with a part in elevation, of a small portion of a completed ring gasket having a heat and solvent resistant flexible tape jacket; and Fig. 5 is a perspective view, with a part broken away to show a cross section, illustrating a modified method of applying a thin flexible tape as a helically wrapped jacket about the exposed surface of the shaped ring gasket core.

In the following illustrative example the method is applied to the problem of producing a heat resistant gasket of exceptional resistance to deterioration by contact with strong acids. The initial steps of the method have as their objective the formation and shaping of a gasket core of good heat and acid resistance which is suitably resilient and which possesses adequate cohesive strength and freedom from internal stresses or strains.

For forming a ring shaped gasket such as illustrated in the drawings, a plastic mixture of approximately the following composition by weight is first formed:

| | Parts |
|---|---|
| Butyl rubber | 125 |
| Crocidolite asbestos fibers | 250 |
| Vulcanizing accelerators | 3 |
| Sulphur | 2 |
| Stearic acid | 3 |
| Powdered carbon black | 25 |

Figure 1:
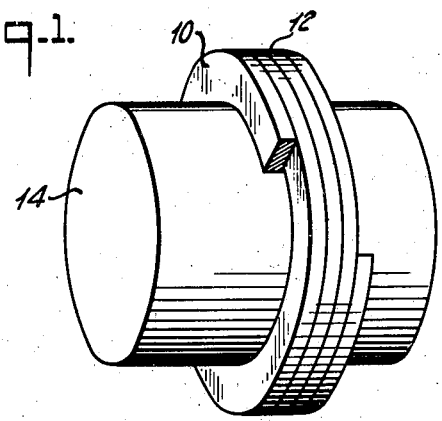
Fig. 1 illustrates diagrammatically a preferred method of forming a resilient fibrous core for a ring gasket in such a way as to avoid development of internal stresses or strains.
Figure 2:
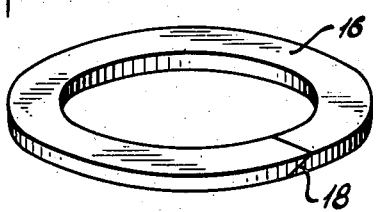
Fig. 2 is a perspective view showing a completed ring shaped gasket core embodying one turn of the helical mandrel wrapping portrayed in Fig. 1.

The above composition is prepared as a plastic extrudable mass by first dissolving or softening the butyl rubber in gasoline, and by then mixing the swelled rubber in a suitable mixer with the remaining ingredients, until a homogeneous mass is obtained. The plastic mixture thus formed is extruded as a strip 10 having the thickness and width of the desired gasket core. A suitable ring shape is imparted to the extruded strip as it leaves the extruder nozzle by winding the strip as a helical coil 12 about a cylindrical mandrel 14 having a diameter corresponding to the desired inside diameter of the gasket, as portrayed in Fig. 1. The helical coil thus formed is then dried, and the ends of a single turn of the dry helix are cut on the bias and cemented together to form a ring gasket core 16 having a skive joint 18 (Fig. 2).

Figure 3:
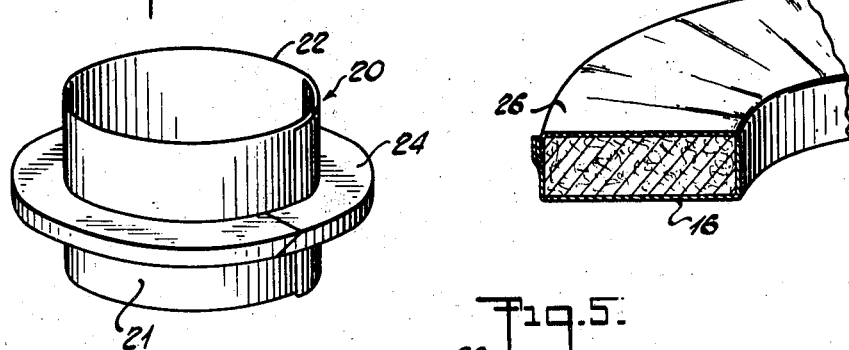
Fig. 3 is a perspective view illustrating the initial step in a preferred method of applying a thin flexible tape as a jacket wrapping about the exposed surfaces of the ring gasket portrayed in Fig. 2.

A strip of plastic tape 20 of suitable width and length is now coated on one side 21 with an adhesive cement, and after a proper drying period the tape is shaped to the inside diameter of the ring gasket and is affixed thereto in such a way that the lateral edges 22 of the tape overhang by approximately equal amount of each side of the center line of the gasket ring (Fig. 3). The lateral edges of the tape are then folded over in such a way as to cover both major flat surfaces 24 of the gasket, and the edges of the folded tape are brought together and cemented in lapped relation to complete the formation of a jacket 26 covering all outside exposed surfaces of the gasket 16 (Fig. 4). After the gasket is wrapped it may be finished in a conventional manner, as by subjecting it to vulcanization. It will be appreciated that this cure may be an air cure, a dry heat cure, press cure, or a steam vulcanizer cure, depending on the formulation of the gasket core composition and on the physical properties which are desired in the finished product.

The core of the gasket is fully protected against contact with corrosive gas or hot liquids or vapors, by the wrapped flexible heat and solvent resistant tape jacket. One suitable material for forming the jacket consists of highly polymerized tetrafluor ethylene, which resists substantially all known solvents and chemicals and which is available in the form of a flexible tape of 2-10 inches width and of about .003 inch thickness. Since this material is insoluble it cannot be used in the form of a solution or cement for coating a gasket core as by painting, spraying or dipping. Moreover, since this plastic material is highly heat resistant and has a softening temperature above 500° F., it cannot be applied in liquid form. As an alternative to a polymerized synthetic resin tape jacket for the gasket, certain kinds of acid resistant flexible metal foils, such as lead foil, may also be used for forming the jacket.

The indicated formulation for the gasket core contains ingredients which have been particularly selected to produce a core of good resistance to strong acids. To impart high alkali resistance, or high resistance to organic solvents, synthetic rubbers of the polyvinyl or polyvinylidene type and butadiene copolymers such as butadiene-styrene may be substituted for the butyl rubber, and asbestos fibers of the chrysotile type may be substituted for the crocidolite asbestos.

The purpose of the invention is served by incorporating in the gasket core any composition of fibers and rubberlike binder material having such physical and chemical properties as to form a plastic extrudable mixture which, on subsequent drying or evaporation of solvent, will produce a gasket of desired physical strength, density and toughness.

By the method of the present invention it is possible to provide resilient gaskets having superior heat and chemical resistance in comparison to any soft resilient gaskets now available, and the chemical resistance of which is determined and limited only by the chemical resistance of the jacket. The gasket may be produced to any desired degree of resilience or compressibility by suitably compounding the extruded gasket core, and by adequate control of extrusion pressures, final curing conditions and other processing variables.

It will be recognized that the manner of wrapping the gasket core with the tape 20 may be considerably varied. For example, the tape 20 may be applied to the gasket core by wrapping it helically about the periphery of the ring gasket in a manner similar to that employed for wrapping automobile tires with paper (Fig. 5). Before wrapping the gasket core with the tape, one surface of the tape should be coated with an adhesive cement, as for example a suitable rubber cement, and the end of the wrapping tape should be folded against the adjacent surface of the gasket to form a smooth outer surface for the jacket.

The invention is not limited in application to the manufacture of a ring gasket, since the gasket core strips 10, and the jacket tape 20, may be made up into gaskets of rectangular form. Since all surfaces of the gasket core are completely covered by the tape wrapping, the gasket is fully protected from attack by hot gases or liquids such, for example, as hot concentrated nitric acid. The illustrated jacketed gasket of Fig. 4 is so constructed as to seal off any portions thereof which might be vulnerable against deterioration contact with chemicals flowing through a pipe joint which is sealed by the gasket.

Since many variations may be made from the illustrative details given, without departing from the scope of the invention, it is intended that the invention should be limited only by the terms of the claims interpreted as broadly as consistent with novelty over the prior art.

What I claim is:

1. That method of forming a heat and solvent resistant ring gasket which comprises, forming a resilient fibrous strip gasket, and wrapping a thin, flexible heat and solvent resistant tape comprising tetrafluor-ethylene polymer in tightly fitting relation over all exposed surfaces of the strip as a core, and sealing lapped edges of the tape to form a completely enclosing jacket for the gasket.

2. The method of forming a heat and chemical resistant gasket which comprises, forming a plastic mixture of fibrous material and rubbery binder material to a strip of suitable width and thickness, shaping said strip to approximately the final form of the desired gasket, joining the ends of the strip to form a resilient gasket core, wrapping the core with a thin, flexible, heat and solvent resistant tape tightly jacketing all peripheral surfaces of the gasket, and lapping and sealing the edges of the tape to form a smoothly finished jacket.

3. The method of forming a heat and acid resistant gasket which comprises, forming a plastic vulcanizable mixture comprising crocidolite asbestos fiber and butyl rubber binder to a strip of suitable width and thickness, shaping said strip and joining bias cut ends to form a resilient gasket, wrapping the gasket with a thin, flexible, heat and solvent resistant tetrafluor-ethylene polymer tape to form a tightly fitting jacket covering all peripheral surfaces of the gasket, and subjecting the jacketed gasket to a vulcanizing cure.

4. A method of forming a heat, chemical and solvent resistant gasket which comprises, mixing a major proportion of asbestos fibers with a plasticized chemical resistant rubbery binder to form a plastic mixture, extruding said mixture to a strip of suitable width and thickness, shaping said extruded strip to approximately the final form of the desired gasket, joining the ends of the strip to form a gasket core, wrapping a thin, flexible, heat and solvent resistant tape tightly about the core to cover all peripheral surfaces of the gasket, and lapping and sealing any exposed edges of the tape to form a smoothly finished jacket.

EMIL J. POLTORAK.

REFERENCES CITED

The following references are of record in the file of this patent:

UNITED STATES PATENTS

| Number | Name | Date |
|---|---|---|
| 1,695,822 | Restein | Dec. 18, 1928 |
| 1,715,356 | Griffith | June 4, 1929 |
| 2,173,744 | Payne | Sept. 19, 1939 |

FOREIGN PATENTS

| Number | Country | Date |
|---|---|---|
| 6,961 | Switzerland | July 5, 1893 |
| 343,387 | Italy | Sept. 28, 1936 |